Figure 1:
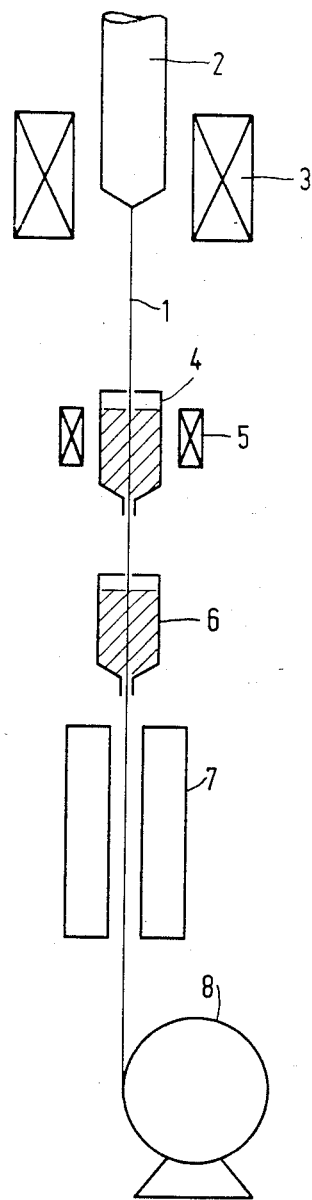

United States Patent [19]

Broer

[11] Patent Number: 4,741,597
[45] Date of Patent: May 3, 1988

[54] METHOD OF MANUFACTURING AN OPTICAL FIBRE HAVING A SYNTHETIC RESIN COATING AND OPTICAL FIBRE HAVING A SYNTHETIC RESIN COATING MANUFACTURED ACCORDING TO THE METHOD

[75] Inventor: Dirk J. Broer, Eindhoven, Netherlands

[73] Assignee: U.S. Philips Corporation, New York, N.Y.

[21] Appl. No.: 781,428

[22] Filed: Sep. 30, 1985

[30] Foreign Application Priority Data

Oct. 18, 1984 [NL] Netherlands .................. 8403179

[51] Int. Cl.$^4$ .................................................. G02B 1/04
[52] U.S. Cl. ................................ 350/96.34; 350/96.33; 427/44
[58] Field of Search ............... 350/96.34, 96.33, 96.30, 350/96.29; 427/163, 44; 428/375, 392

[56] References Cited

U.S. PATENT DOCUMENTS

| | | | |
|---|---|---|---|
| 4,125,644 | 11/1978 | Ketley et al. | 427/44 X |
| 4,334,733 | 6/1982 | Takeshima et al. | 350/96.34 X |
| 4,482,204 | 11/1984 | Blyler, Jr. et al. | 350/96.34 |

Primary Examiner—John Lee
Assistant Examiner—Michael Menz
Attorney, Agent, or Firm—Norman N. Spain

[57] ABSTRACT

Method of manufacturing an optical fibre having a synthetic resin coating and optical fibre having a synthetic resin coating manufactured according to the method. The invention provides a method of rapidly coating an optical fibre with two layers of a synthetic resin, the first layer being formed from a reactive molten synthetic resin material. This molten synthetic resin material is solidified by cooling after which the second layer, which can be any customary curable synthetic resin composition, is applied. Next, both layers are cured together, for example, by exposure to UV-light. The reactive molten synthetic resin material comprises at least two acrylate ester groups per molecule.

7 Claims, 2 Drawing Sheets a b c

METHOD OF MANUFACTURING AN OPTICAL FIBRE HAVING A SYNTHETIC RESIN COATING AND OPTICAL FIBRE HAVING A SYNTHETIC RESIN COATING MANUFACTURED ACCORDING TO THE METHOD

The invention relates to a method of manufacturing an optical fibre having a synthetic resin coating which consists of at least two layers, according to which method the optical fibre is enveloped with two synthetic resin layers immediately after it has been formed, the second synthetic resin layer being formed from a curable synthetic resin composition which is made to cure by exposing it to electrons or to UV-light.

The invention further relates to an optical fibre having a synthetic resin coating manufactured according to this method.

The optical fibre can be produced by means of known methods such as drawing from a preform or by the double crucible method. "Immediately after it has been formed", is to be understood to mean that, prior to the application of the synthetic resin coating, the optical fibre will not be stored, wound on a reel, guided along a guide wheel or undergo any other mechanical treatment.

The invention can be applied to, for example, optical glass fibres for telecommunication purposes, in which it is common practice to use fibres having dual-layer coatings. The first, relatively soft, layer serves to prevent microbending of the optical fibre caused by variations in temperature or by bending of the cable which accomodates the optical fibre. The second layer, which is harder, serves to prevent the optical fiber from being damaged.

Such an optical fibre and a method of manufacturing thereof are described in, for example, German Patent Application DE 3106451. Both the first and the second layer of the fibre described therein consist of liquid curable synthetic resin compositions. The first layer is made to cure by exposing it to UV-light, whereupon the second layer is applied and subsequently cured. In order to prevent the optical fibre from being damaged, at least one enveloping layer must be applied to the optical fibre prior to any mechanical contact. Nor shall there by any mechanical contact with the curable synthetic resin composition on the optical fibre until it has cured to a sufficient degree. In optical fibre production, the production rate is often determined by the radiation curing process. The time required to obtain a non-sticking layer generally exceeds 0.5 seconds, and often it takes even more than 5 seconds. On the other hand, it is desirable to increase the drawing speed of, for example, a glass fibre from a preform to more than 5 m/s. If both synthetic resin layers are formed from curable synthetic resin compositions, it is necessary to use an uneconomically large device for the production and coating of an optical fibre.

It is the object of the invention to provide a method and an optical fibre, which method enables a high coating-rate of the optical fibre, which fibre obtains the favourable properties of a dual-layer synthetic resin coating. A further object of the invention is to provide an optical fibre which is suitable for further handling at higher temperatures.

This object is accomplished in accordance with the invention by a method as described in the opening paragraph, in which the first synthetic resin layer is formed from a molten synthetic resin material which comprises at least two acrylate ester groups per molecule, and in which the second synthetic resin layer is applied after the first layer has cooled and solidified, the two layers being cured simultaneously by exposure to radiation. Preferably, the molten synthetic resin material is a polyurethane acrylate compound.

When using a molten synthetic resin material, a high coating rate is achieved due to the use of a finished polymeric material. Care should only be taken that, prior to mechanical contact with the optical fibre and prior to application of the second synthetic resin layer, the temperature of the first synthetic resin layer is lower than the melting temperature of the synthetic resin material used. When a liquid curable synthetic resin compostion is used, such contact should be avoided and the second layer can only be applied after the polymerisation reaction, initiated by the radiation process, has been completed to a sufficient degree. This leads to a large distance between the first and the second coating position. As further curing of the first and the second layer takes place simultaneously, no additional space is required.

The method in accordance with the invention has the additional advantage that a more efficient use can be made of, for example, the UV-light source or the electron radiation device because one step in the radiation process can be omitted.

In addition, a molten synthetic resin material hardly shows any signs of polymerization shrinkage during the curing process because the molten synthetic resin material already has a high molecular weight before it is cured. Thus, the development of mechanical stresses in the first synthetic resin layer is prevented.

If an optical fibre is used which consists mainly of quartz or quartz glass, it is advantageous to radiate the fibre by means of UV-light only once after both layers have been applied, because the risk of chemical decomposition of the quartz or the quartz glass caused by UV-radiation, is reduced.

Another additional advantage of simultaneously curing the two synthetic resin layers is that the polymer molecules of both layers may become linked, which results in improved adhesion between the synthetic resin layers and hence a greater strength of the entire optical fibre.

U.S. Pat. No. 4,147,407 discloses a method of applying a coating to an optical fibre in which the fibre is drawn through a molten synthetic resin material and then cooled to solidify the coating. In this method, however, no second coating is applied to the optical fibre. Moreover, the molten synthetic resin material is not radiation cured after cooling. For subsequent treatment and storage of the optical fibre, for example, if the fibre has to be provided with a thermoplastic cladding, it may be necessary for the coating to withstand higher temperatures. In an improved embodiment, a layer of a molten synthetic resin material which comprises at least two acrylate ester groups per molecule is provided around the optical fibre immediately after the fibre has been formed, whereupon the layer is cooled and hence solidified and subsequently cured by exposure to radiation. For the reasons stated above, a synthetic resin coating comprising at least two layers of different mechanical properties is generally preferred.

To improve the wetting of the optical fibre by the molten synthetic resin material, this material suitable comprises of from 0.1 to 2% by weight of aluminium stearate.

The second synthetic resin coating can be formed from any curable synthetic resin composition appropriate to the art, for example a polysiloxane compound or a polyether urethane acrylate compound.

Both synthetic resin coatings can be made to cure by means of electron radiation. In this case neither the molten synthetic resin material nor the curable synthetic resin composition need comprise an initiator. The synthetic resin coatings can be made to cure, for example, by means of radiation using electrons with an energy of from 100 to 500 keV. This can be done with, for example, an Electrocurtain apparatus (product of Energy Sciences Inc., Woburn, Mass.).

In another preferred embodiment of the method in accordance with the invention, the molten synthetic resin material comprises a light sensitive initiator and both synthetic resin coatings are made to cure by means of radiation using UV-light. In a suitable embodiment of this method, the molten synthetic resin material comprises of from 1 to 5% by weight of the light sensitive initiator which is selected from the group formed by 2,2-dimethoxy-2-phenyl-acetophenone, 2,2-diethoxy-acetophenone and 2,2-dimethyl-2-hydroxy-acetophenone. A high-pressure mercury vapor lamp which produces light having wavelengths ranging from 200 to 400 nm and an intensity, measured on the synthetic resin coatings, of 0.6 W/cm$^2$ can, for example, be used for the UV-radiation process.

Figure 3:
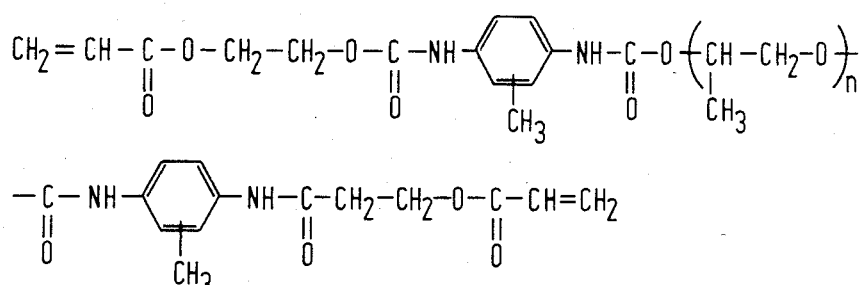
Figure 4:
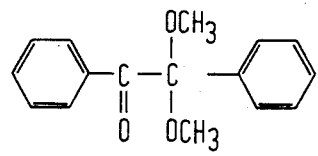
Figure 4:
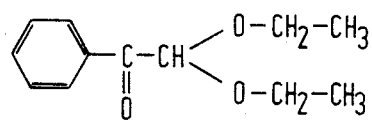
Figure 4:
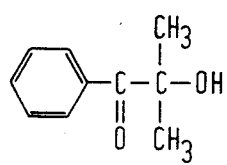
Figure 5:
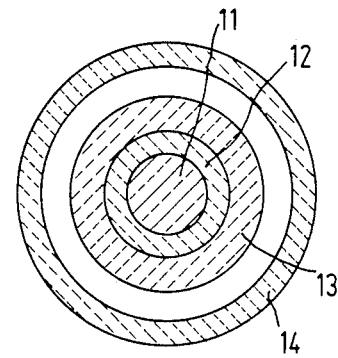

The method in accordance with the invention may be very advantageously used for the manufacture of an optical fibre which must be resistant to further handling, for example, cabling. It is possible, for example by means of extrusion, to provide a thermoplastic cladding, for example polyamide, around the optical fibre, which cladding is in direct contact with the optical fibre or surrounds it like a sleeve. Embodiments of the method and of the optical fibre in accordance with the invention will now be explained in greater detail with reference to the accompanying drawing, in which FIG. 1 schematically shows a device which is suitable for the application of the method in accordance with the invention, FIG. 2 shows the structure formula of a polyurethane acrylate compound which is solid at room temperature, FIG. 3 shows the structural of a polyurethane acrylate compound which is liquid at room temperature, FIG. 4a shows the structural formula of 2,2-dimethoxy-2-phenyl-acetophenone, FIG. 4b shows the structural formula of 2,2-diethoxy-acetophenone, FIG. 4c shows the structural formula of 2,2-dimethyl-2-hydroxy-acetophenone, FIG. 5 is a sectional view of an embodiment, in accordance with the invention, of an optical fibre provided with a synthetic resin coating and a cladding of a thermoplastic material.

EMBODIMENT OF THE METHOD IN ACCORDANCE WITH THE INVENTION

FIG. 1 schematically shows a device which is suitable for the application of the method. In known manner, a glass fibre 1 is drawn from a preform 2 in a furnace 3. Immediately after the formation of the glass fibre, a molten synthetic resin layer is applied thereto. For that purpose, means are used which are known per se, such as the coating device 4 which has a heating device 5.

Figure 2:
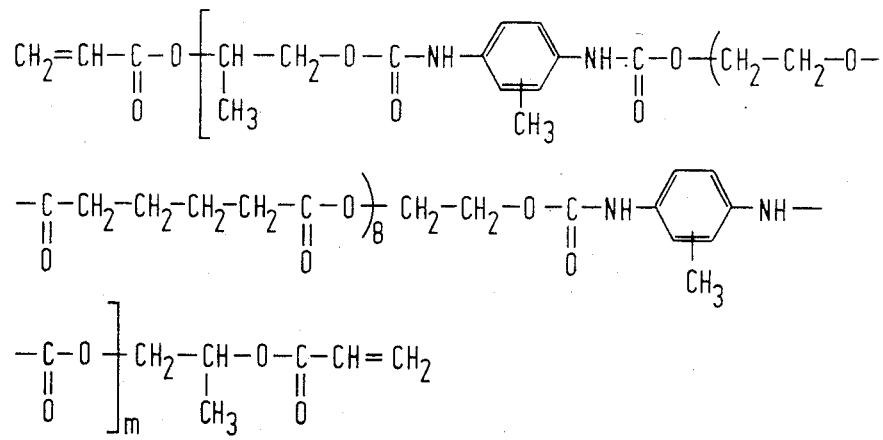

The polyurethane-acrylate compound shown in FIG. 2, where the average value of m is between 2 and 3, is an example of a suitable molten synthetic resin material. A suitable synthetic resin material of this type which is commercially available is Uvithane 782, manufactured by Thiokol Specialty Chemicals Division, its number-averaged molecular weight is 4760. Its melting point is at 35° C., the glass transition temperature, measured by means of a torsion pendulum device, is at −35° C. The synthetic resin material is applied to the glass fibre at a temperature of 80° C., at this temperature the viscosity of the molten synthetic resin material is 12 Pa.s. Furthermore, 4% by weight of 2,2-dimethoxy-2-phenyl-acetophenone (see FIG. 4a) and 1% by weight of aluminum stearate has been added to the molten synthetic resin material. Other light sensitive initiators, such as for example, 2,2-diethoxy-acetophenone (FIG. 4b) and 2,2-dimethyl-2-hydroxy-acetophenone (FIG. 4c) are also suitable. After application of the molten synthetic resin material to the optical fibre, the latter is cooled causing the synthetic resin material to solidify.

Other molten synthetic resin materials are also suitable for use in the method according to the invention, provided that they are suitable for further curing by means of radiation. Preferably, a synthetic resin material is selected whose melting point is only slightly above room temperature, so that the coating temperature is low and the cooling time is short. Moreover, thermal polymerization is avoided thereby. With methods according to the present state of the art, in which a molten synthetic resin material is applied to an optical fibre, the melting point is generally higher in order to ensure satisfactory durability of the coated optical fibre. This has now become less important since, in accordance with the invention, the synthetic resin material will be subjected to further curing.

Subsequently, the optical fibre with the first synthetic resin layer is provided with a layer of a curable synthetic resin composition by means of the cladding device 6. Next the curable synthetic resin composition is cured, thus forming the second synthetic resin layer. A suitable curable synthetic resin composition comprises 70% by weight of the polyurethane acrylate compound shown in FIG. 3, in which the average value of n is 20 and to which 15% by weight of trimethylol propane triacrylate, 10% by weight of tripropylene glycol diacrylate, 4% by weight of 2,2-dimethoxy-2-phenyl-acetophenone (FIG. 4a) and 1% by weight of triethanolamine (as an accellerator) are added. Other synthetic resin compositions are also suitable, such as for example, polyepoxy-acrylate compounds, polyester-acrylate compounds and polyether-acrylate compounds to which, for example, hexane dioldiacrylate has been added. Commercially available synthetic resin compositions such as DeSolite 950×042 or DeSolite 950×078, manufactured by DeSoto, Inc. are suitable for use in the method according to the invention. They are UV-curable synthetic resin compositions based on polyurethane-acrylate compounds.

The curable synthetic resin composition is cured together with the first synthetic resin layer, by exposure to UV-light for 0.5 s, which light is produced by a high-pressure mercury vapour lamp 7, which produces light with wavelengths ranging from 200 to 400 nm and which has an intensity of 0.6 W/cm$^2$, measured on the synthetic resin layers. After the synthetic resin coating has been cured, the optical fibre can be wound on a reel 8.

Furthermore, a thermoplastic cladding can be provided around the coated optical fibre, which cladding is made of, for example, nylon, polyvinylidene fluoride or polybutylene terephtalate. Such a cladding can be in direct contact with the synthetic resin coated optical fibre. On the other hand, it is also possible to use a tube as a cladding, in which the coated optical fibre can move freely.

EMBODIMENT OF AN OPTICAL FIBRE IN ACCORDANCE WITH THE INVENTION

FIG. 5 is a sectional view of an optical glass fibre 11 having a dual-layer synthetic resin coating 12 and 13 and a thermoplastic cladding 14 which surrounds the optical fibre like a tube. Layer 12 is made of a molten synthetic resin material and layer 13 of a curable synthetic resin composition. Suitable dimensions are, for example: a glass fibre having a diameter of 125 $\mu$m, layers 12 and 13 having a layer thickness of 30 $\mu$m each and a cladding having a diameter of 1 mm and a wall thickness of 150 $\mu$m.

Glass fibre 11 may consist of a core and a cladding (not shown in FIG. 5) which have different refractive indices, however, dependent upon the type of glass fibre, it is also possible that the refractive index changes gradually as a function of the distance to the central axis of the fibre. The fibre shown in FIG. 5 has a circular section, but any other shape, for example, elliptical, is also possible.

The method in accordance wth the invention and the optical fibre manufactured by means of this method are not limited to the present examples. For example, the second synthetic resin layer may generally be made of a liquid curable synthetic resin composition however, within the scope of the invention, it is also possible to use a curable molten synthetic resin material of a type similar to that used for the first synthetic resin layer, but having a suitable rigidity and hardness after curing.

What is claimed is:

1. A method of manufacturing an optical fibre having a synthetic resin coating which consists of at least two layers, according to which method the optical fibre is enveloped with two synthetic resin layers immediately after it has been formed, the second synthetic resin layer being formed from a curable synthetic resin composition which is completely cured by exposing it to radiation by electrons or to UV-light radiation, characterized in that the first synthetic resin layer is formed from a molten synthetic resin material which comprises at least two acrylate ester groups per molecule, and in which the second synthetic resin layer is applied after the first layer has cooled and solidified and the two layers are completely cured simultaneously by exposure to radiation by electrons or UV-light.

2. A method as claimed in claim 1, characterized in that the molten synthetic resin material used is a polyurethane acrylate compound.

3. A method as claimed in claim 1 characterized in that the molten synthetic resin material comprises of from 0.1 to 2% by weight of aluminum stearate.

4. A method as claimed in claim 1, characterized in that both synthetic resin layers are cured by means of electron radiation.

5. A method as claimed in claim 1, characterized in that the molten synthetic resin material comprises a light sensitive initiator, and that both synthetic resin layers are cured by means of UV-light radiation.

6. A method as claimed in claim 5, characterized in that the molten synthetic resin material comprises of from 1 to 5% by weight of the light sensitive initiator which is selected from the group consisting of 2,2-dimethoxy-2-phenyl-acetophenone, 2,2-diethoxy-acetophenone and 2,2-dimethyl-2-hydroxy-acetophenone.

7. An optical fibre having a synthetic resin coating manufactured by means of the method as claimed in claim 1 characterized in that the optical fibre is further provided with a thermoplastic cladding.

* * * * *